United States Patent [19]

Peterson

[11] 4,184,954
[45] Jan. 22, 1980

[54] SEDIMENTATION DEVICE AND METHOD FOR PURIFYING WASTE WATER

[76] Inventor: Albert C. Peterson, 103 E. 113th Ter., Kansas City, Mo. 64114

[21] Appl. No.: 23,177

[22] Filed: Mar. 23, 1979

[51] Int. Cl.² .................... B01D 21/14; B01D 23/02
[52] U.S. Cl. ................................. 210/83; 210/82; 210/199; 210/219; 210/220; 210/333 A; 210/521
[58] Field of Search ........................... 210/82–84, 210/199, 219, 220, 221 P, 333 R, 333 A, 322, 411, 521, 522, 525; 261/77, 93, 122–124

[56] References Cited

U.S. PATENT DOCUMENTS

| | | | |
|---|---|---|---|
| 2,464,707 | 3/1949 | Montgomery et al. | 210/220 X |
| 2,713,026 | 7/1955 | Kelly et al. | 210/221 P X |
| 3,074,561 | 1/1963 | Mummert | 210/333 A |
| 3,307,701 | 3/1967 | Krofta | 210/199 X |
| 3,635,348 | 1/1972 | Carr | 210/333 A |
| 3,703,465 | 11/1972 | Reece et al. | 210/333 A |
| 3,773,179 | 11/1973 | Hurst | 210/322 X |
| 3,784,016 | 1/1974 | Akiyama | 210/333 A |
| 3,820,659 | 6/1974 | Parlette | 210/525 X |
| 3,935,105 | 1/1976 | McEwen | 210/411 X |
| 3,966,598 | 6/1976 | Ettelt | 210/221 P X |

FOREIGN PATENT DOCUMENTS

2648545  5/1978  Fed. Rep. of Germany ........... 210/220

OTHER PUBLICATIONS

*Practical Application of Idealized Sedimentation Theory In Wastewater Treatment;* Hansen et al.; Journal Water Pollution Control, Aug. 1969.
*Applying Shallow Depth Sedimentation Theory,* Hansen et al., Neptune Microfloc Inc., 1967.

*Primary Examiner*—Richard L. Chiesa
*Attorney, Agent, or Firm*—Fishburn, Gold & Litman

[57] ABSTRACT

A sedimentation basin for purifying waste water includes first and second basins separated by a baffle and a tube settler mounted substantially horizontally in the baffle. The tube settler comprises a plurality of individual tubes which communicate liquid between the two basins. A mechanism is provided to flow unclarified liquid into the first basin and slowly through the tube settler, whereby particles suspended in the unclarified liquid settle onto an inner surface of the tubes, and the resultant clarified liquid flows into the second basin. A tube cleaner is mounted on the device for intermittent registry with an upstream end of the tubes, and creates a suction backwash therein during the registry which reverses the direction of fluid flow with sufficient velocity to dislodge and draw the settled particles from the inner surface of the tubes, and flush the same into a sludge disposal duct.

12 Claims, 5 Drawing Figures

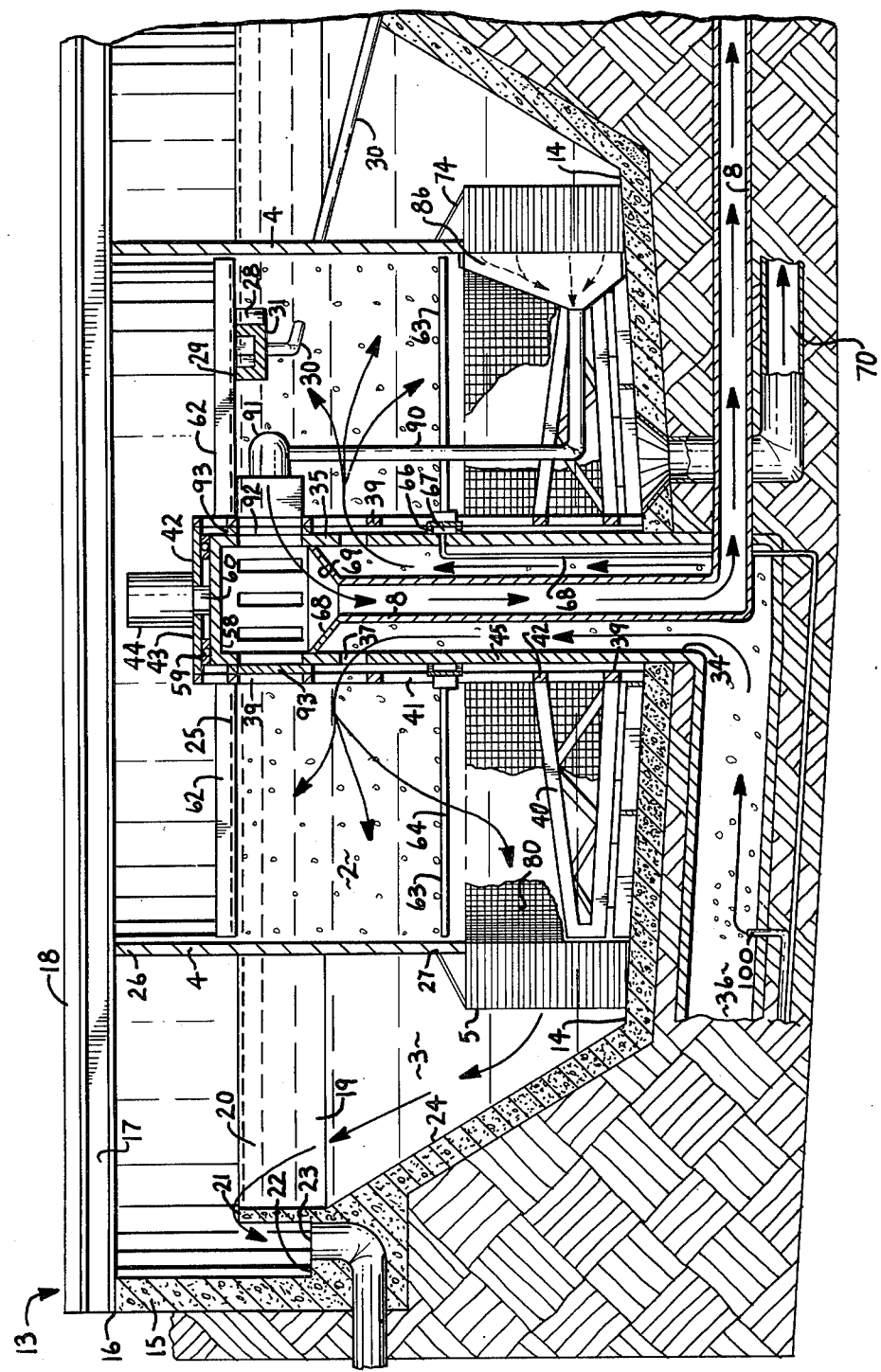

SEDIMENTATION DEVICE AND METHOD FOR PURIFYING WASTE WATER

BACKGROUND OF THE INVENTION

The present invention relates to a method and a device designed to separate solid particles from a liquid, and in particular, to a sedimentation method and device for purifying waste water.

The removal of particulate matter by sedimentation is widely known and used in the field of water and waste treatment. Large, expensive settling tanks are conventionally used to achieve gravity separation of particles from waste water or other liquids. Such tanks must be sufficiently large to retain an average daily flow of waste water for at least several hours to achieve even minimum clarification.

Recently, shallow depth sedimentation devices, such as tube settlers, have been employed to improve clarification and achieve increased clarifying speed. The tube settlers comprise a plurality of relatively small, interconnected tubes which are placed in the flow path of the waste water, and are sized to insure laminar flow characteristics therethrough. As the waste water flows through the tube settler, the particulate matter therein settles onto the inside surfaces of the tubes and collects thereon to form a sludge. Heretofore, removal of the sludge from the tubes was accomplished by mounting the tubes at a slight incline in the direction of flow, temporarily halting waste water flow through the tubes, and allowing the tubes to drain under gravitational forces. This tube settler configuration requires that the separator be shut down for a period of time to accomplish cleaning of the tubes. Further, as sludge collects in the tubes, flow therethrough is restricted, thereby decreasing clarifying speed. Another known method to accomplish tube cleaning, but with continuous waste water separation, is to mount the tubes at an incline in excess of 45°, so that as the sludge builds up on the inner surfaces of the tubes, gravitational forces cause the same to slide downwardly, and continuously evacuate the tubes without interrupting the flow of waste water through the settler. However, the steeply inclined tube settlers require longer tubes to accomplish acceptable clarification, increase the resistance to fluid flow therethrough, and expose the waste water to a continuously evacuating stream of sludge which may become re-suspended in the waste water. Also, in the field of sewage treatment, organic matter which is settled from the fluid tends to be rather sticky, and adheres to the walls of the tube settler, thereby exacerbating the tube cleaning problem.

SUMMARY OF THE INVENTION

The principal objects of the present invention are: to provide an efficient sedimentation device for purifying waste water; to provide such a device which quickly and inexpensively removes a high percentage of particulate matter from the waste water; to provide such a device having two basins with a horizontal tube settler therebetween; to provide such a device with a continuous purifying operation; to provide such a device having a tube cleaner to remove settled particles from the inner surfaces of the settling tubes; to provide such a device wherein the basins are circular in shape and the waste water flows continuously radially outwardly through the tube settler; to provide such a device having an air header in the inner basin to float lighter particles to the surface thereof; to provide such a device wherein the air header rotates in the inner basin; to provide such a device wherein the tube cleaner rotates and continuously sweeps the upstream end of the settling tubes; to provide such a device wherein the basins have a common, inclined bottom, and the inner basin includes a rake which rotates and sweeps the bottom to urge particles toward an inner periphery thereof; to provide an efficient method for purifying waste water by sedimentation; and to provide such a device which is economical to manufacture, efficient in use, and capable of a long operating life, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is an enlarged, fragmentary, vertical cross sectional view of the sedimentation device taken along the line 2—2, FIG. 1.

DESCRIPTION OF A PREFERRED EMBODIMENT

Figure 1:
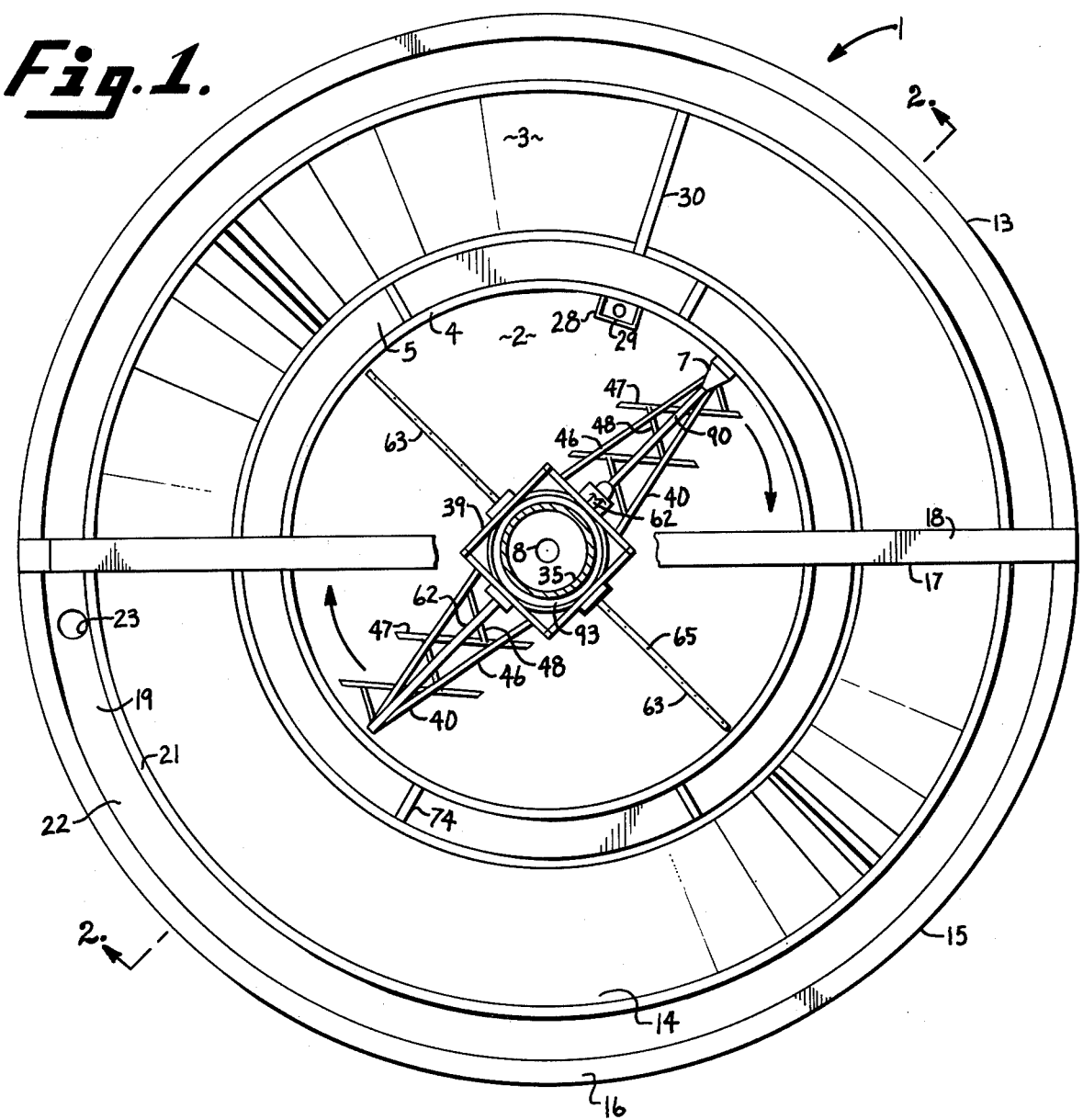
FIG. 1 is a top plan view of a sedimentation device embodying the present invention, with portions thereof broken away to reveal internal construction.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure.

For purposes of description herein, the terms "upper," "lower," "right," "left," "rear," "front," "vertical," "horizontal," and derivatives thereof relate to the invention as oriented in FIG. 2, however, it is to be understood that the invention may assume various alternative orientations, except where expressly specified to the contrary.

The reference numeral 1 generally designates a sedimentation device for purifying waste water, and includes first and second basins 2 and 3 respectively separated by baffle 4 and a tube settler 5, which is mounted substantially horizontally in the baffle 4. The tube settler 5 comprises a plurality of individual tubes 6 (FIG. 3) which communicate liquid between the two basins 2 and 3. The unclarified waste water is flowed into the first basin 2, and thence slowly through the tube settler 5, whereby particles suspended in the unclarified liquid settle onto an inner surface of the tubes, and the resultant clarified liquid flows into the second basin 3. A tube cleaner 7 is mounted on the device for intermittent registry with an upstream end of the tube 6, and creates a suction back wash therein during the registry which reverses the direction of fluid flow with sufficient velocity to dislodge and draw the settled particles from the inner surface of the tubes, and flush the same into a sludge disposal duct 8.

The first and second basins illustrated in FIG. 2 are formed from a large fluid reservoir 13 which is circular in shape and includes a bottom 14 and an upstanding side wall 15. It is to be understood that although the illustrated basins are circular, the present invention contemplates any suitable basin shape, including rectangular. The reservoir is constructed of a rigid, durable, moisture impervious material, such as poured concrete. The upper edge 16 of the reservoir side wall 15 preferably extends above the ground level, and supports a rigid structural member 17 thereon. In this example, the structural member 17 comprises a beam assembly which extends diametrically across the reservoir 13, and includes a walk way surface 18 on the upper surface thereof to provide access to the center portion of the device. An effluent wier 19 is mounted on the inside surface of the reservoir side wall 15 and extends continuously thereout. The effluent wier 19 has a forward flange portion 20 with an upper rim or edge 21 positioned substantially at the water line of the reservoir, and is adapted to allow the clarified waste water to flow thereover into the wier. The bottom 22 of the wier 19 includes at least one drain 23, which is preferably located at a low spot therein and flows the clarified water out of the sedimentation device to a storage area. The bottom 24 of the outer basin 3 is steeply inclined downwardly from the base of the effluent wier to the bottom of the tube settler 5, whereby any particulate matter which might settle out of the fluid in the outer basin will be deposited adjacent to the downstream side of the tube settler and be removed by the tube cleaner 7.

The baffle 4 divides the reservoir 13 into the inner and outer basin 2 and 3 respectively. In this example, the baffle 4 is circular in shape, and has the upper end 26 thereof rigidly attached to the beam assembly 17. The lower end 27 of the baffle 4 is fixedly attached to and supported by the tube settler 5. A scum trough 28 is attached to the inside surface of the baffle 4, and is adapted to dispose of scum skimmed from the top of the inner basin 2. The scum level 25 is slightly higher in elevation than the water level in the outer basin 3. The upper edge 29 of the scum trough is positioned slightly above the water level in the inner basin. A drain conduit 30 is attached to the bottom 31 of the scum trough 28, extends through the baffle 4, and carries the scum deposited in the trough to a disposal area.

As best illustrated in FIG. 2, the inner basin 2 includes a center column 35 which extends upwardly through the bottom 14 of the reservoir. The center column 35 is a rigid tubular structure located at the center of the reservoir, and has the lower end 34 thereof connected and communicating with an influent duct 36. The center column 35 includes a plurality of circumferentially spaced discharge apertures 37 at an upper portion thereof which permit the influent liquid to flow upwardly through the center of the column 35 and radially outwardly through the discharge aperture 37 into the inner basin 2. The discharge apertures 37 are regularly spaced about the center column 35 to insure a uniform flow of influent liquid into the inner basin.

A center cage 39 is rotatably mounted on the center column 35, and supports a pair of rake arms 40 which sweep the bottom 14 of the inner basin 2, and urge the particles deposited thereon toward the center of the reservoir. In the illustrated structure, the center cage 39 has a rectangular shape (as viewed from FIG. 2) and is constructed from a frame work of vertically and horizontally disposed structural beams 41 and 42 respectively. The upper, horizontally disposed beams 42 of the center cage 39 form a top 43 on which a motor and gear reducer assembly 44 is mounted. The vertical beams 41 extend downwardly from the center cage top 43 along the side wall 45 of the center column, to a point adjacent to the reservoir bottom 14. The rake arms 40 are attached to the lower portion of the center cage 39, extend radially in diametrically opposite directions from the center of the device, and rotate with the center cage. The rake arms 40 illustrated in FIG. 1, include a radially extending truss 46 with inclined blades 47 connected therebetween. Braces 48 extend between the leading and trailing portions of adjacent blades 47 to form a triangular support structure. The center cage 39 rotates in the direction of the arrow shown in FIG. 1, and the rake arms 40 scrape the particulate matter settled on the bottom 14 of the inner reservoir toward the center of the device. The lower edges of the blades 47 may be provided with a flexible seal or squeegy (not shown) to seal against the reservoir bottom 14 and improve collection of the particles settled thereon. The baffle 4 forces the influent water to flow radially outwardly through the tube settler 5.

The center column 35 (FIG. 2) includes a stationary top portion 58 on which a thrust bearing 59 is mounted. The top 43 of the center cage 39 engages the upper surface of the thrust bearing 59 and rotatably mounts the center cage to the center column. The drive motor and gear reducer 44 includes a shaft 60 which extends through the cage top 43 and is attached to the column top 58, whereby relative rotation of the motor shaft and housing rotates the cage with respect to the center column.

A pair of skimming blades 62 are attached to the upper portion of the center cage 39, and extend in diametrically opposite directions therefrom. The skimmer blades 62 rotate with the center cage 39 and skim the foam or flocculated material from the surface of the liquid and deposit the same into the skum trough 28. To facilitate the removal of the lighter particles in the waste water, a plurality of air headers 63 are mounted in the inner basin 2 and bleed air into the unclarified liquid to raise lightweight particles therein to the surface of the inner basin. In the illustrated example, four air headers 63 are spaced radially about the center cage 39, and each includes an elongate tube 64 which extends from the center cage to the inner surface of the lower end 27 of the baffle 4. Each of the tubes 64 includes a plurality of longitudinally spaced apertures 65 (FIG. 1) through which the air is bubbled or sparged into the unclarified liquid in the inner basin. Preferably, the air headers 63 rotate with the center cage 39 to evenly distribute the air bubbles throughout the inner basin 2. As shown in FIG. 2, the tubes 64 are disposed below the discharge apertures 37 in the center column 35, so that the lighter particles in the influent will be raised to the surface, while the heavier and medium weight particles are guided directly to the tube settler 5. The tubes 64 may be provided with a diffuser (not shown) at each aperture 65 to obtain a fine bubble discharge. A pair of seals 66 are positioned between the center column 35 and center cage 39 and are radially spaced apart to form an annularly shaped, air-tight chamber 67 which communicates with the air tubes 64. The chamber 67 is connected with a source of pressurized air through a conduit 68.

The sludge duct 8 is positioned concentrically within the center column 35, and includes a funnel shaped segment 69 thereof at the upper portion of the duct to guide the sludge thereinto. An additional sludge duct 70 is provided in the bottom of the inner basin 2. The rake arm 40 urges particulate matter settled onto the bottom of the inner basin 2 into the sludge duct 70.

Figure 3:
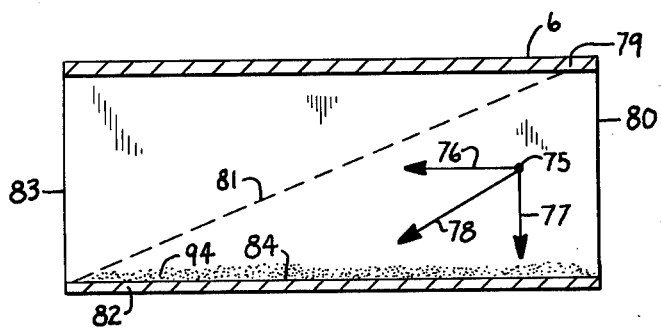
FIG. 3 is an enlarged, vertical cross sectional view of a tube portion of the sedimentation device.
Figure 4:
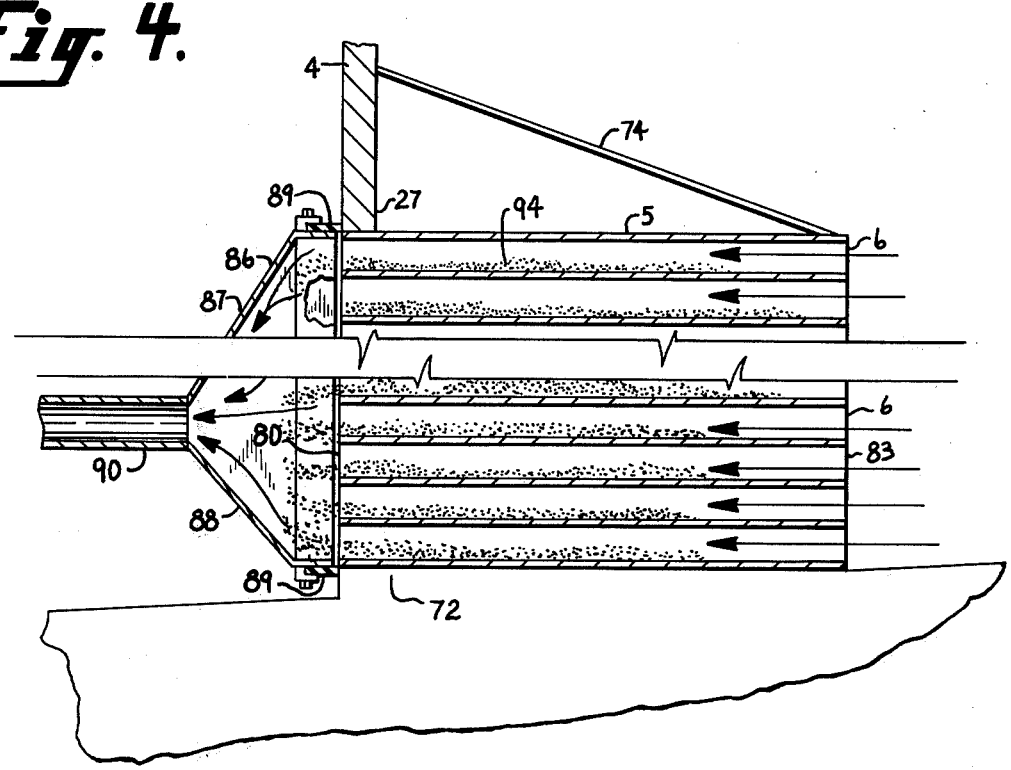
FIG. 4 is a vertical cross sectional view of a tube cleaner portion of the sedimentation device.

The tube settler 5 is connected with the baffle 4, and communicates the inner and outer basins 2 and 3 respectively. In this example, the bottom of the tube settler 5 is fixedly attached to and abuttingly supported by an inclined portion 72 of the basin floor. The upper portion of the tube settler 5 is attached to the lower end of the baffle 4, thereby securely locating the tube settler in the sedimentation device. As best illustrated in FIG. 4, the tube settler 5 includes a plurality of individual tubes 6 through which the waste water flows. The illustrated tubes 6 have a substantially square lateral cross sectional shape, are grouped into an angular ring connected with and depending from the lower end 27 of the baffle 4, and are oriented in a radial direction. The illustrated tubes 6 are stacked vertically with ends aligned, and into a group approximately eight feet in height. Means such as the illustrated triangular braces 74 are used to securely attach the tube settler 5 to the baffle 4. Each of the individual tubes 6 are similarly shaped, and include a length which is commensurate with the clarification flow rate, and type of waste water to be treated. The illustrated tubes 6 are in the nature of 2–4 feet in length and have a width and height of approximately 2 inches. As shown in FIG. 3, a particle suspended in the influent, schematically illustrated by the point 75, has a velocity component in the horizontal direction, as represented by the vector associated with reference numeral 76, as a result of its suspension in the moving waste water. The particle 75 also has a vertical velocity component noted by the reference numeral 77, which results from gravitational forces acting on the particle, and the same is proportional to the weight thereof. Resolution of the horizontal and vertical vectors 76 and 77 respectively results in a downwardly inclined vector 78 which generally indicates the path which the particle 75 will follow through the tube 6. The length of the tube 6 is selected such that the lightest particles in the waste water which enter the tube 6 just below the inner surface of the upper wall 79 at the upstream end 80 follow the imaginary line 81 and are deposited on the lower tube wall 82 adjacent the downstream end 83 of the tube. The particles in the waste water generally settle and collect upon the inner surface 84 of the lower tube wall 82.

The tube cleaner 7 is mounted on the center cage 39, rotates therewith, and includes a snout member 86 shaped for intermittent registry with the upstream end 80 of the tubes 6. The snout member 86 illustrated in FIG. 4 is elongate, extending vertically from the uppermost to the lowermost tubes, and has upper and lower sides 87 and 88 thereof with free edges arcuately shaped to mate with the upstream ends 80 of the tubes. Preferably, the snout member 86 has a width greater than that of a single tube, such that registry between the tube cleaner and the tubes has a duration sufficient to completely clean each of the tubes. In this example, a flexible seal 89 extends completely around the periphery of the snout member 86, and forms a seal against the tube settler 5. A pipe 90 has one end thereof connected with the snout 86, and the other end connected with a suction pump and motor 91. The suction pump and motor 91 are attached to the center cage 39, such that the entire tube cleaner 7 rotates therewith. The center column 35 includes a plurality of sludge discharge apertures 92 spaced around the circumference of the upper portion thereof at a point just above the funnel area 68. A pair of seals 93 are disposed on either side of the sludge discharge apertures 92 to form an annularly shaped chamber which prevents the sludge from entering the waste water and/or the moving parts of the sedimentation device. The suction pump and motor 91 create a suction backwash in the snout member 86 which reverses the direction of fluid flowed through those tubes in registry with the snout member with sufficient velocity to dislodge and draw the settled particles 94 from the inner surfaces of the tube, and withdraw the same through the pipe 90 and flush them into the sludge disposal duct 8. The snout member 86 rotates with the center cage 39 and sweeps about the upstream end of each of the settling tubes and regularly cleans the same.

Figure 5:
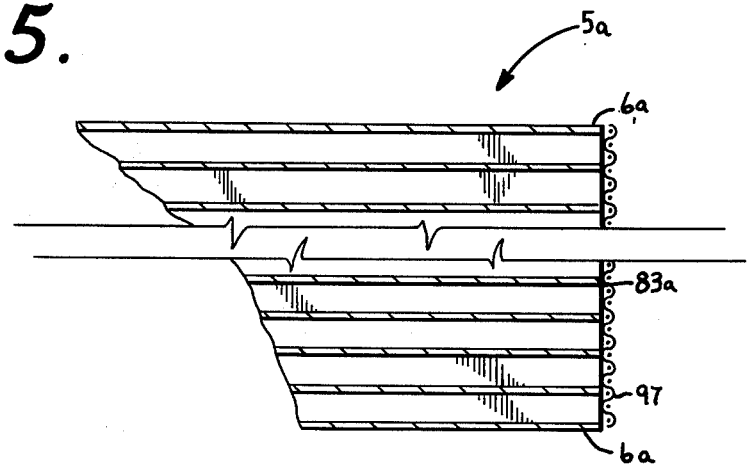
FIG. 5 is a vertical cross sectional view of a second embodiment of the sedimentation device, particularly showing a tube settler portion thereof having a mechanical screen.

The reference numeral 5a generally designates another embodiment of the present invention (FIG. 5) having a screen 97 positioned over the downstream end 83a of the tubes 6a. Since the tube settler 5a is otherwise substantially similar to the previously described settler 5, similar parts appearing in FIGS. 1–4 and 5 respectively are represented by the same, corresponding reference numeral, except for the suffix "a" in the numerals of the latter. The screen 97 is of a very fine mesh and is designed to act as a final mechanical filter on the waste water. The screen 97 is cleaned by the suction backwash of the tube cleaner 7.

In use, waste water influent is introduced through the influent duct 36. As illustrated in FIG. 2, an air header 100 may be positioned in an upstream portion of the duct 36 to bleed air and/or a flocculating agent into the influent waste water. The influent duct 36 directs the waste water to the center of the sedimendation device, and thence vertically upwardly into the interior of the center column 35. The waste water flows radially outwardly through the discharge apertures 37 in the center column 35, past the vertical braces 41 of the center cage 39 into the inner basin 2. The lightweight, flocculated particles in the waste water tend to rise to the surface of the inner basin 2, and the bubbling air headers 63 increase the rate of assent of such light particles. The flocculated particles form a foam on the surface of the inner basin 2 which is skimmed off of the surface by the rotating skimmer blades 62, and the foam is deposited into the scum trough 28. The heaviest particles in the waste water settle directly onto the bottom 14 of the inner basin and are collected by the rake arm 40 and directed into the sludge duct 70. The remaining particles flow with the waste water through the tube settler 5, wherein the particles settle onto the lower surface of each of the tubes. The clarified waste water then flow out of the tube settler 5 into the outer basin 3. The waste water flows radially outwardly from the tube settler 5, and passes over the rim 21 into the effluent wier 19 and is transported for collection and storage through the pipe 23. The particulate matter which settles on the inside surfaces of the tubes 6 is cleaned therefrom by the tube cleaner 7 which sweeps around the upstream end 80 of each of the tube settler tubes 6 and creates a suction backwash therein which reverses the direction of the fluid flow through the tubes during registry with the same with sufficient velocity to dislodge and draw the settled particles 94 from the tube surfaces. The rotating tube cleaner 7 selectively and cyclically back flushes the tubes by a sudden reverse flow of water, whereby clarified water is drawn from the outer basin through the tubes and thereby purges the same. The sludge from the tubes is directed through the pipe 90 and into the sludge duct 8 for ultimate disposal.

It is to be understood that while I have illustrated and described certain forms of my invention, it is not to be limited to the specific forms or arrangement of parts herein described and shown.

What is claimed and desired to secure by Letters Patent is:

1. A method for clarifying waste water comprising the steps of:
   (a) providing first and second sedimentation basins with a substantially horizontally oriented tube settler having a plurality of individual tubes connected between and communicating said basins;
   (b) flowing the waste water from said first basin slowly through said tube settler to settle particulate matter suspended in the waste water onto a lower surface of said tubes, and direct the clarified waste water into said second basin; and
   (c) selectively and cyclically backflushing the waste water in the tubes, whereby the particulate matter settled on the tube lower surfaces is drawn, along with the backflush water, from the tubes and into a sludge disposal duct for continuous clarification of the waste water.

2. A method as set forth in claim 1 wherein:
   (a) said backflushing comprises applying a suction to an upstream end of the tubes to suddenly reverse fluid flow therethrough, whereby clarified water is drawn from the second basin through the tubes and thereby purges the same.

3. In a sedimentation device for purifying waste water having first and second basins separated by a baffle, the improvement comprising:
   (a) a tube settler connected with said baffle and mounted substantially horizontally therein, and having a plurality of individual tubes communicating liquid between said first and second basins;
   (b) means flowing unclarified liquid into the first basin and slowly through the tube settler, whereby particles suspended in the unclarified liquid settle onto an inner surface of the tubes, and the resultant clarified liquid flows into the second basin; and
   (c) a tube cleaner mounted on the sedimentation device with means for intermittent registry with an upstream end of said tubes, and including means creating a suction backwash therein which reverses the direction of fluid flow through said tubes during registry with said tube cleaner, with sufficient velocity to dislodge and draw the settled particles from the inner surface of the tubes and flush the same into a sludge disposal duct.

4. A device as set forth in claim 3 wherein:
   (a) said tube cleaner includes a snout member movably mounted on said device and having an open end thereof in mating registry with the upstream end of the tubes; and including
   (b) means intermittently positioning the snout open end adjacent to the upstream end of the tubes during a cleaning position, and translating the snout away from the cleaned tubes during a waste water clarifying position.

5. A device as set forth in claim 3 wherein:
   (a) said first and second basins are circularly shaped, and concentrically disposed;
   (b) said tube settler has an annular shape, and the tubes are oriented substantially radially; and
   (c) said tube cleaner is rotatably mounted on said device, rotates with respect to the tube settler, and sequentially sweeps the upstream end of each of the tubes to continuously clean the same.

6. A device as set forth in claim 5 wherein:
   (a) said first basin is positioned inwardly of the second basin.

7. A device as set forth in claim 6 including:
   (a) a rake arm rotatably mounted in said first basin and sweeping the bottom thereof to urge particles settled thereon toward an inner periphery of said first basin.

8. A device as set forth in claim 5 including:
   (a) an air header mounted in said first basin and bleeding air into the unclarified liquid to raise lightweight particles therein to the surface of said first basin; and wherein
   (b) said unclarified liquid is introduced into the first basin at a point spaced above said air header.

9. A device as set forth in claim 8 wherein:
   (a) said air header extends radially in said first basin, and includes means rotating the same with said tube cleaner.

10. A device as set forth in claim 9 wherein:
    (a) said first basin includes a skimmer for removing light particulate matter from the unclarified liquid.

11. A device as set forth in claim 10 wherein:
    (a) said unclarified liquid is introduced into the first basin at an elevation above that of the tube settler.

12. A device as set forth in claim 3 including:
    (a) a screen covering a downstream end of said tubes for removing particles from the unclarified liquid.

* * * * *